US008782983B2

(12) United States Patent
Stearns (10) Patent No.: US 8,782,983 B2
(45) Date of Patent: Jul. 22, 2014

(54) ROOF MOUNT ASSEMBLY AND METHOD OF MOUNTING SAME (71) Applicant: Vermont Slate & Copper Services, Inc., Morrisville, VT (US)

(72) Inventor: Brian C. Stearns, Stowe, VT (US)

(73) Assignee: Vermont Slate & Copper Services, Inc., Morrisville, VT (US)

( * ) Notice: Subject to any disclaimer, the term of this patent is extended or adjusted under 35 U.S.C. 154(b) by 0 days.

(21) Appl. No.: 13/623,348

(22) Filed: Sep. 20, 2012

(65) Prior Publication Data

US 2013/0074441 A1 Mar. 28, 2013

Related U.S. Application Data (60) Provisional application No. 61/538,262, filed on Sep. 23, 2011.

(51) Int. Cl.
*E04D 13/00* (2006.01)
(52) U.S. Cl.
USPC .................................. 52/410; 52/24; 248/237
(58) Field of Classification Search
CPC ....... E04D 13/1415; E04D 5/145; E04B 1/62; E04G 3/26; Y01B 10/12; Y01B 10/20
USPC ......... 52/24, 25, 26, 58, 60, 90.2, 173.3, 409, 52/410, 411, 698, 705, 746.11; 126/621, 126/623; 136/244; 248/237
See application file for complete search history.

(56) References Cited

U.S. PATENT DOCUMENTS

| 473,512 A | 4/1892 | Laird |
| 756,884 A | 4/1904 | Parry |
| 1,646,923 A | 10/1927 | Martens |
| 1,925,263 A | 9/1933 | Levow |

(Continued)

FOREIGN PATENT DOCUMENTS

| CH | 204783 | 5/1939 |
| CH | 671063 A5 | 7/1989 |

(Continued)

OTHER PUBLICATIONS

International Preliminary Report on Patentability for Application No. PCT/US2012/027798 dated Sep. 26, 2013 (7 pages).

(Continued)

*Primary Examiner* — Jeanette E Chapman
*Assistant Examiner* — James Buckle, Jr.
(74) *Attorney, Agent, or Firm* — Michael Best & Friedrich LLP (57) ABSTRACT A roof mounting system for mounting one or more roof-mounted fixtures to a roof includes a roofing system having a top surface and a roof attachment assembly mounted to the top surface of the roofing system. The roof attachment system includes a plate having an aperture, at least one membrane patch coupled to the plate, at least one disc including a disc aperture, a nut, and a first fastener including a head positioned adjacent the at least one membrane patch and a shaft extending through the at least one disc aperture and the nut. A second fastener includes a head positioned adjacent the plate and a shaft extending through the plate aperture and through the roofing system top surface, to connect the roof attachment assembly to the roofing system.

24 Claims, 8 Drawing Sheets

(56) References Cited

U.S. PATENT DOCUMENTS

| | | |
|---|---|---|
| 2,079,768 A | 5/1937 | Levow |
| 2,349,467 A | 5/1944 | Scott |
| D139,568 S | 11/1944 | Hinchman |
| 2,890,664 A | 6/1959 | Rachlin |
| 2,925,976 A | 2/1960 | Martin |
| D188,221 S | 6/1960 | Maro |
| 3,141,532 A | 7/1964 | Runyan |
| 3,182,762 A | 5/1965 | Syak et al. |
| 3,633,862 A | 1/1972 | Breen |
| 3,880,405 A | 4/1975 | Brueske |
| 3,937,121 A | 2/1976 | Schubert |
| 3,998,019 A | 12/1976 | Reinwall, Jr. |
| 4,226,058 A | 10/1980 | Riley |
| 4,269,012 A | 5/1981 | Mattingly et al. |
| 4,321,745 A | 3/1982 | Ford |
| 4,325,178 A | 4/1982 | Pruehs |
| 4,348,846 A | 9/1982 | Bellem |
| 4,367,864 A | 1/1983 | Eldeen |
| 4,404,962 A | 9/1983 | Zinn et al. |
| 4,554,773 A | 11/1985 | Conley |
| D293,203 S | 12/1987 | Hertensteiner |
| D294,904 S | 3/1988 | Bleskachek |
| 4,744,187 A | 5/1988 | Tripp |
| 4,763,456 A | 8/1988 | Giannuzzi |
| 4,778,702 A * | 10/1988 | Hutter, III .................... 428/40.9 |
| 4,796,403 A | 1/1989 | Fulton et al. |
| 4,892,429 A | 1/1990 | Giannuzzi |
| 4,903,997 A | 2/1990 | Kifer |
| 4,927,305 A | 5/1990 | Peterson, Jr. |
| 5,082,412 A | 1/1992 | Thomas |
| 5,127,205 A | 7/1992 | Eidson |
| 5,207,043 A | 5/1993 | McGee et al. |
| 5,217,191 A | 6/1993 | Smith |
| 5,228,248 A | 7/1993 | Haddock |
| 5,353,473 A | 10/1994 | Sherick |
| 5,431,372 A | 7/1995 | Kostelecky |
| 5,483,772 A | 1/1996 | Haddock |
| 5,491,931 A | 2/1996 | Haddock |
| D368,648 S | 4/1996 | Losier |
| 5,528,872 A | 6/1996 | Rotter |
| 5,547,226 A | 8/1996 | Wentworth |
| 5,557,903 A | 9/1996 | Haddock |
| 5,609,326 A | 3/1997 | Stearns et al. |
| 5,613,328 A | 3/1997 | Alley |
| 5,685,508 A | 11/1997 | Smith |
| 5,687,936 A | 11/1997 | Wilson |
| D388,136 S | 12/1997 | Lecocq et al. |
| 5,692,352 A | 12/1997 | Simpson |
| 5,694,721 A | 12/1997 | Haddock |
| 5,715,640 A | 2/1998 | Haddock |
| 5,797,232 A | 8/1998 | Larson |
| 5,813,649 A | 9/1998 | Peterson et al. |
| 5,873,201 A | 2/1999 | Fey |
| 5,882,043 A | 3/1999 | Murphy et al. |
| D409,078 S | 5/1999 | Bolt |
| 5,983,588 A | 11/1999 | Haddock |
| D426,453 S | 6/2000 | Stearns et al. |
| D428,799 S | 8/2000 | Stearns et al. |
| D430,005 S | 8/2000 | Stearns et al. |
| 6,164,033 A | 12/2000 | Haddock |
| 6,193,455 B1 | 2/2001 | Levey |
| 6,354,046 B1 | 3/2002 | Swearingen |
| 6,360,491 B1 | 3/2002 | Ullman |
| 6,414,237 B1 | 7/2002 | Boer |
| 6,453,623 B1 | 9/2002 | Nelson et al. |
| 6,470,629 B1 | 10/2002 | Haddock |
| 6,514,005 B2 | 2/2003 | Shiokawa et al. |
| 6,526,701 B2 | 3/2003 | Stearns et al. |
| 6,536,729 B1 | 3/2003 | Haddock |
| 6,718,718 B2 | 4/2004 | Haddock |
| 6,868,647 B2 | 3/2005 | Poldmaa |
| 6,918,724 B2 | 7/2005 | Eriksson |
| 7,013,612 B2 | 3/2006 | Haddock |
| 7,069,698 B2 | 7/2006 | Nee |
| 7,100,338 B2 | 9/2006 | Haddock |
| 7,174,677 B1 | 2/2007 | Dressler |
| 7,260,918 B2 | 8/2007 | Liebendorfer |
| 7,434,362 B2 | 10/2008 | Liebendorfer |
| 7,600,349 B2 | 10/2009 | Liebendorfer |
| 7,686,268 B2 | 3/2010 | Terunuma et al. |
| 7,703,256 B2 | 4/2010 | Haddock |
| D617,174 S | 6/2010 | Schaefer et al. |
| 7,730,901 B2 * | 6/2010 | Ball .......................... 137/15.17 |
| 7,758,011 B2 | 7/2010 | Haddock |
| 7,762,027 B1 | 7/2010 | Wentworth et al. |
| 7,789,365 B2 | 9/2010 | Durig et al. |
| 7,857,269 B2 | 12/2010 | Plaisted et al. |
| 7,861,485 B1 | 1/2011 | Wentworth et al. |
| 7,866,099 B2 | 1/2011 | Komamine et al. |
| 7,895,808 B1 | 3/2011 | Wentworth et al. |
| 7,900,413 B2 | 3/2011 | Stanley |
| 7,905,064 B1 | 3/2011 | Wentworth et al. |
| 7,935,202 B2 | 5/2011 | Stanley |
| 7,946,082 B2 | 5/2011 | Ohkoshi et al. |
| 7,956,280 B2 | 6/2011 | Kobayashi |
| 7,987,641 B2 | 8/2011 | Cinnamon |
| 8,122,648 B1 | 2/2012 | Liu |
| 8,136,311 B2 | 3/2012 | Liu |
| 8,166,720 B2 | 5/2012 | Garrigus et al. |
| 8,448,405 B2 * | 5/2013 | Schaefer et al. ................. 52/710 |
| 2002/0035811 A1 | 3/2002 | Heuel |
| 2002/0046506 A1 | 4/2002 | Ullman |
| 2002/0066235 A1 | 6/2002 | Stearns et al. |
| 2002/0088196 A1 | 7/2002 | Haddock |
| 2002/0131842 A1 | 9/2002 | Eriksson |
| 2003/0101662 A1 | 6/2003 | Ullman |
| 2003/0177706 A1 | 9/2003 | Ullman |
| 2004/0173373 A1 | 9/2004 | Wentworth et al. |
| 2006/0010786 A1 | 1/2006 | Rogers |
| 2007/0245636 A1 | 10/2007 | Ayer et al. |
| 2007/0266672 A1 | 11/2007 | Bateman et al. |
| 2007/0289233 A1 | 12/2007 | Haddock |
| 2008/0000173 A1 | 1/2008 | Lenox et al. |
| 2008/0087275 A1 | 4/2008 | Sade et al. |
| 2008/0190047 A1 | 8/2008 | Allen |
| 2008/0245404 A1 | 10/2008 | DeLiddo |
| 2008/0313976 A1 | 12/2008 | Allen |
| 2009/0309388 A1 | 12/2009 | Ellison |
| 2010/0192505 A1 | 8/2010 | Schaefer et al. |
| 2010/0236155 A1 | 9/2010 | Lanza |
| 2010/0307074 A1 | 12/2010 | Stearns et al. |
| 2011/0120047 A1 | 5/2011 | Stearns et al. |
| 2011/0135882 A1 | 6/2011 | Stanley |
| 2011/0138602 A1 | 6/2011 | Stanley |
| 2011/0162779 A1 | 7/2011 | Stanley |
| 2011/0204195 A1 | 8/2011 | Stanley |
| 2011/0240207 A1 | 10/2011 | Stanley |
| 2011/0247279 A1 | 10/2011 | Stearns et al. |
| 2011/0247295 A1 | 10/2011 | Stearns et al. |
| 2012/0017529 A1 * | 1/2012 | Shadwell et al. ............... 52/410 |
| 2012/0233958 A1 | 9/2012 | Stearns |
| 2013/0298494 A1 * | 11/2013 | Corsi .............................. 52/705 |

FOREIGN PATENT DOCUMENTS

| | | |
|---|---|---|
| DE | 3716491 A1 | 12/1988 |
| DE | 3723020 A1 | 1/1989 |
| GB | 666147 | 2/1952 |
| JP | 5-346055 | 12/1993 |
| JP | 8193392 | 7/1996 |
| JP | 2004300668 | 10/2004 |
| JP | 2008274591 | 11/2008 |
| JP | 2011047154 | 3/2011 |
| WO | 2011032134 | 3/2011 |

OTHER PUBLICATIONS

"AET T6 Pitched Roof PV Rail System" Brochure, Applied Energy Technologies (Available at least as early as Oct. 20, 2011).

Affordable Solar, UniRac PRO-PAK Standard Rail 204, available at least as early as Jan. 9, 2009.

Affordable Solar, Solar Panel Mounts & Solar Trackers for Solar Power Systems, available at least as early as Jan. 9, 2009.

(56) References Cited

OTHER PUBLICATIONS

"E-Ton Solar" Brochure, E-Ton Solar Tech. Co., Ltd. (Available at least as early as Oct. 20, 2011).
"Fall Protection in Construction", OSHA Laws 3146; 1995.
"Genmounts Solar Racking Systems" Brochure (Available at least as early as Oct. 20, 2011).
MacDonald, "Inspecting the Scaffold" and Protective Roofing Products LTD. advertisement, (Available at least as early as Oct. 20, 2011) Roofing Contractor 6.00.
"Mage Powertec Kits" Brochure, Mage Solar Projects, Inc. (Available at least as early as Oct. 20, 2011).
Non-Final Office Action, U.S. Appl. No. 12/727,726, mailed Sep. 16, 2011.
Non-Final Office Action, U.S. Appl. No. 13/166,378, mailed Sep. 19, 2011.
Non-Final Office Action, U.S. Appl. No. 12/914,209, mailed Sep. 20, 2011.
Non-Final Office Action, U.S. Appl. No. 13/166,542, mailed Sep. 16, 2011.
Omco Solar Brochure (Available at least as early as Oct. 20, 2011).
"Orion Solar Racking Jupiter Series Ground Mount System" Brochure, Orion Solar Racking (Available at least as early as Oct. 20, 2011).
"Phono Solar Tigo Energy Smart Module" Brochure, Phono Solar Technology Co., Ltd. (Available at least as early as Oct. 20, 2011).
"Polar Racking PolaRail Flush Mount Racking System" Brochure, Polar Racking Inc. Brochure, Schletter Inc. (Available at least as early as Oct. 20, 2011).
"PowAR Grip Product Sheet", A Raymond Tinnerman Industrial, Inc. (Available at least as early as Oct. 20, 2011).
Product Advertisement, "Alpine Snowguards/Setting the Industry Standard/Snow Guards for Every Roof Type" Mar. 27, 2000.
Product Advertisement, "Speedstand", Contractors Guide, Jun. 2000.
Product Advertisement—Sarna, Sarnafil Division (Available at least as early as Oct. 20, 2011).
Product Description—"An Innovative Approach to Zero Roof Penetrations", Portable, Pipe Hangers, Inc., printed Jul. 2000.
Product Description—"Flat Roof Safety System", POHL Roof and Safety Systems,Securant, (Available at least as early as Oct. 20, 2011).
Product Description—"Gecko-An Introduction", Gecko Safety Systems, Fall Arrest Protection, printed Jul. 2000.
Product Description—"Instruction and Specification Manual, Super Anchor: Fall Arrest Anchor. ARS-2.times.8 and ARS-2.times.12", 1993.
Product Description—"Super Anchor: Instruction/Specification Manual: Stainless Steel Fall Arrest Anchors ARS 2.times.8, ARS 2.times.12, I-Joist, Moveable ARS, Vertical Wall Anchor, and Custom Anchor", Mar. 2000.
Product Description—Anchor Guardrails, printed Aug. 2000.
Product Description—FLUX-Boy (available at least as early as Oct. 20, 2011).
Product Description—Gecko-An Introduction, Gecko Safety Systems, Ltd., printed Mar. 2000.
Product Description—Portable Pipe Hangers, Inc., Inter517face, Jun. 2000.
Product Description—Portable Pipe Hangers, printed Aug. 2000.
Professional Solar Products Inc., Fast Jack, available at least as early as Jan. 9, 2009.
Professional Solar Products Inc., FastJack Commercial Fast Jack, Commercial Leveling Kit, Comparison Chart for the Fast Jack, available at least as early as Jan. 9, 2009.
Professional Solar Products Inc., FastJack Installation Manual, modified Sep. 10, 2007.
Professional Solar Products Inc., FastJack Leveling Kits, available at least as early as Jan. 9, 2009.
"Prysmian Cables & Systems Photovoltaic (PV) System Products" Product Sample and Brochure, Prysmian Power Cables and Systems USA, LLC (Available at least as early as Oct. 20, 2011).

"Quick Mount PV" Brochure (Available at least as early as Oct. 20, 2011).
Quickscrews International Corporation brochure (Available at least as early as Jun. 29, 2011).
"Rapid2+ Clamp Product Sheet", Schletter Inc. (Available at least as early as Oct. 20, 2011).
"S-51 CorruBracket" Brochure, Metal Roof Innovations, Ltd. (Available at least as early as Oct. 20, 2011).
S-5! Dirimak Brochure (Available at least as early as Jul. 18, 2011).
S-5! Dirimak Product Photographs (Available at least as early as Jul. 18, 2011).
"S-5! S-5-U and S-5-U Mini" Brochure, Metal Roof Innovations, Ltd. (Available at least as early as Oct. 20, 2011).
"S-5! VersaBracket" Brochure, Metal Roof Innovations, Ltd. (Available at least as early as Oct. 20, 2011).
"Schletter Professional Solar Mounting Systems Mounting and Project Planning" Brochure, Schletter Inc. (Available at least as early as Oct. 20, 2011).
"Solar Power International 11 SPI Daily News—Thursday, Oct. 20, 2011" Solar Power International 2011 (Oct. 20, 2011).
"Solar Security Fasteners" Brochure, Duncan Solar (Available at least as early as Oct. 20, 2011).
"Sunmodo Ez Roof Mount Installation Guide" (Available at least as early as Oct. 20, 2011).
"Sunmodo Ez Roof Mount L Foot for Shingle Roofs" Brochure (Available at least as early as Oct. 20, 2011).
"Sunmodo Ez Mount Standoff for Metal Roofs" Brochure (Available at least as early as Oct. 20, 2011).
"Sunmodo Ez Roof Mount Standoff for Shingle Roofs" Brochure (Available at least as early as Oct. 20, 2011).
"Sunmodo Solar Mounting System" Brochure (Available at least as early as Oct. 20, 2011).
"Tecsun (UL) PV-Wire" Brochure, Prysmian Cables and Systems USA, LLC Brochure, Schletter Inc. (Available at least as early as Oct. 20, 2011).
TileTrac Product Photograph (Available at least as early as Jun. 8, 2011).
"TileTrac Tile Roof Structural Attachment" Brochure, Professional Solar Products, Inc., Copyright Mar. 2011.
UFD (Universal Fastening Disc) Installation Instructions and Design Drawings (Available at least as early as Jul. 14, 2011).
"Zilla Racking & Mounting Components" Zilla Corporation, (available at least as early as Jun. 8, 2009).
"Zilla the King of Racking Racking Systems" Brochure, Zilla Corporation (Available at least as early as Oct. 20, 2011).
"Zilla Zip Flashing Assembly Instructions" Zilla Corporation (Available at least as early as Jun. 8, 2009).
"Zilla Zip Single-Bolt Flashing Assembly" Brochure, Zilla Corporation, Copyright 2011.
"Zilla Zip Single-Bolt Flashing Assembly" Zilla Corporation, Copyright 2011.
Office Action from the United States Patent and Trademark Office for U.S. Appl. No. 13/271,650 dated Jul. 25, 2012 (12 pages).
Office Action from United States Patent and Trademark Office for U.S. Appl. No. 13/271,633 dated Dec. 5, 2011, 7 pages.
Office Action from United States Patent and Trademark Office for U.S. Appl. No. 13/270,419 dated Dec. 22, 2011, 7 pages.
Office Action from United States Patent and Trademark Office for U.S. Appl. No. 13/270,385 dated Dec. 23, 2011, 7 pages.
Office Action from United States Patent and Trademark Office for U.S. Appl. No. 12/727,726 dated Jan. 4, 2012, 5 pages.
Office Action from United States Patent and Trademark Office for U.S. Appl. No. 12/914,209 dated Jan. 27, 2012, 5 pages.
Office Action from the United States Patent and Trademark Office for U.S. Appl. No. 13/270,385 dated Mar. 26, 2012 (7 pages).
Office Action from the United States Patent and Trademark Office for U.S. Appl. No. 13/270,792 dated Apr. 16, 2012 (10 pages).
Office Action from the United States Patent and Trademark Office for U.S. Appl. No. 13/270,798 dated Mar. 26, 2012 (8 pages).
Office Action from the United States Patent and Trademark Office for U.S. Appl. No. 13/271,650 dated Apr. 23, 2012 (13 pages).
Office Action from the United States Patent and Trademark Office for U.S. Appl. No. 13/272,938 dated Apr. 23, 2012 (11 pages).

(56) References Cited

OTHER PUBLICATIONS

Office Action from United States Patent and Trademark Office for U.S. Appl. No. 13/272,938 dated Dec. 22, 2011, 9 pages.
"Advanced Roof Protection" PANELCLAW, (available at least as early as Feb. 16, 2012), 2 pages.
"CENIQ, Mounting instructions" Instruction Manual, Centrosolar Ag, (Oct. 2011), 28 pages.
"Dura-Blok™, A Complete Rooftop Support Solution" brochure, Cooper Industries, PLC, (2010), 16 pages.
"Lightning Rod" drawing sheet, Sika Corporation, (Apr. 2010), 1 page.
"Lightning Rod at Deck Level" drawing sheet, Thermoplastic Universal, (2012), 1 page.
"Lightning Rod at Deck Level With SecurTape" drawing sheet, Thermoplastic Universal, (2011), 1 page.
"Lightning Rod at Parapet (Vertical Attachment)" drawing sheet, Thermoplastic Universal, (2012), 1 page.
"Lightning Rod Detail" drawing sheet, Duro-Last, (1998), 1 page.
"Nobody Covers You Better" drawing sheets, Firestone Building Products, (Jan. 1, 2006), 6 pages.
"Rooftop Mount" Daetwyler Clean Energy Eco-Top™, (2011-2012), 3 pages.
"Scirocco—an innovative solution for low impact and low ballast flat-roof PV installation" brochure, Sloar Canada Inc. (2010-2011), 2 pages.
"Solar" brochure, Lauren Manufacturing, (available at least as early as Feb. 16, 2012), 2 pages.
"Sunrail Flat Roof Mounting System" brochure, Opsun Technologies, Inc. (2011), 2 pages.
Office Action from the United States Patent and Trademark Office for U.S. Appl. No. 13/272,005 dated Nov. 14, 2012 (24 pages).
International Search Report and Written Opinion for Application No. PCT/US2012/027798 dated Sep. 27, 2012 (8 pages).
International Search Report and Written Opinion for Application No. PCT/US2012/033764 dated Oct. 10, 2012 (8 pages).
Office Action from the United States Trademark and Patent Office for U.S. Appl. No. 13/272,938 dated Jul. 26, 2012 (8 pages).
International Preliminary Report on Patentability for Application No. PCT/US2012/033764 dated Jan. 23, 2014 (7 pages).
International Report on Patentability for International Application No. PCT/US2012/056248 dated Mar. 25, 2014 (9 pages).

\* cited by examiner

ROOF MOUNT ASSEMBLY AND METHOD OF MOUNTING SAME

BACKGROUND

The present invention relates to a roof mount assembly for mounting one or more fixtures to a roof and a method for mounting one or more fixtures to the roof.

SUMMARY

In one embodiment, the invention provides a pre-assembled roof mount assembly that is fixable to a roof surface. The pre-assembled roof mount assembly is operable to support one or more roof mountable fixtures after being fixed to the roof surface.

In some embodiments, the invention provides a roof mounting system for mounting one or more roof-mounted fixtures to a roof includes a roofing system having a top surface and a roof attachment assembly mounted to the top surface of the roofing system. The roof attachment system includes a plate having an aperture, at least one membrane patch coupled to the plate, at least one disc including a disc aperture, a nut, and a first fastener including a head positioned adjacent the at least one membrane patch and a shaft extending through the at least one disc aperture and the nut. A second fastener includes a head positioned adjacent the plate and a shaft extending through the plate aperture and through the roofing system top surface, to connect the roof attachment assembly to the roofing system.

In some embodiments, the invention provides a roof attachment assembly mountable to the top surface of a roofing system. The roof attachment system includes a plate defining an aperture and having a central recessed portion, a middle raised portion, a first transition between the central recessed portion and the middle raised portion, an outer recessed portion, and a second transition between the middle raised portion and the other recessed portion. The roof attachment system further includes a first membrane patch coupled to the middle raised portion of the plate, a disc including a disc aperture, a second membrane patch coupled to the first membrane patch and substantially containing the disc between the first membrane patch and the second membrane patch, the second membrane including a membrane aperture, and a fastener including a head positioned adjacent the first membrane patch and a shaft extending through the disc aperture and the membrane aperture. The plate is connected to a roof system by inserting a protrusion into the roof and the plate aperture, and wherein the fastener is connected to a roof-mounted apparatus to support the roof-mounted apparatus on the roof system.

In some embodiments, the invention provides one or more pre-determined points of failure that are designed to fail prior to the connection between the first membrane patch and the membrane of the roofing system. One such pre-determined point of failure is that the second membrane patch is deformable to permit the disc to detach from the roofing system by sliding out through the deformed, and thus enlarged, membrane aperture.

In some embodiments, the invention provides a gauge permitting a user to consistently install a fastener to a pre-determined depth in the roofing system top surface. The gauge defines a thickness and includes a slot. The thickness corresponds to the pre-determined depth and the slot is sized to permit lateral travel of the fastener therethrough. The gauge is positionable adjacent the roofing system top surface and the fastener is insertable through the slot. When the head of the fastener abuts the gauge, the fastener is at the pre-determined depth. The gauge is removed from the fastener by sliding the fastener along the slot to thereby detach the gauge from the fastener and the roofing system. The gauge is re-usable and can be carried or stored easily by the user. In some embodiments, the gauge is the size of a credit card so as to fit into a wallet or pocket. In other embodiments, the gauge has a handle or hook for securing to a tool belt or rope for easy access.

In another embodiment the invention provides a method of mounting the pre-assembled roof mount to a roof surface and mounting one or more roof mountable fixtures to the pre-assembled roof mount after the roof mount is fixed to the roof surface.

In some embodiments, the invention provides a method of installing a roof attachment assembly to a top surface of a roofing system to permit mounting of a roof-mounted apparatus to the roofing system. The method includes inserting a first fastener into the top surface of the roofing system, such that a head of the first fastener protrudes above the top surface of the roofing system, positioning a roof attachment assembly adjacent the head of the first fastener, and inserting the head of the first fastener into an aperture defined in a plate of the roof attachment assembly. The method further includes moving the roof attachment assembly with respect to the head of the first fastener to couple the roof attachment assembly to the roofing system, forming a seal around the first fastener, and coupling a roof-mounted apparatus to the roof attachment assembly to thereby mount the roof-mounted apparatus to the roofing system.

Other aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
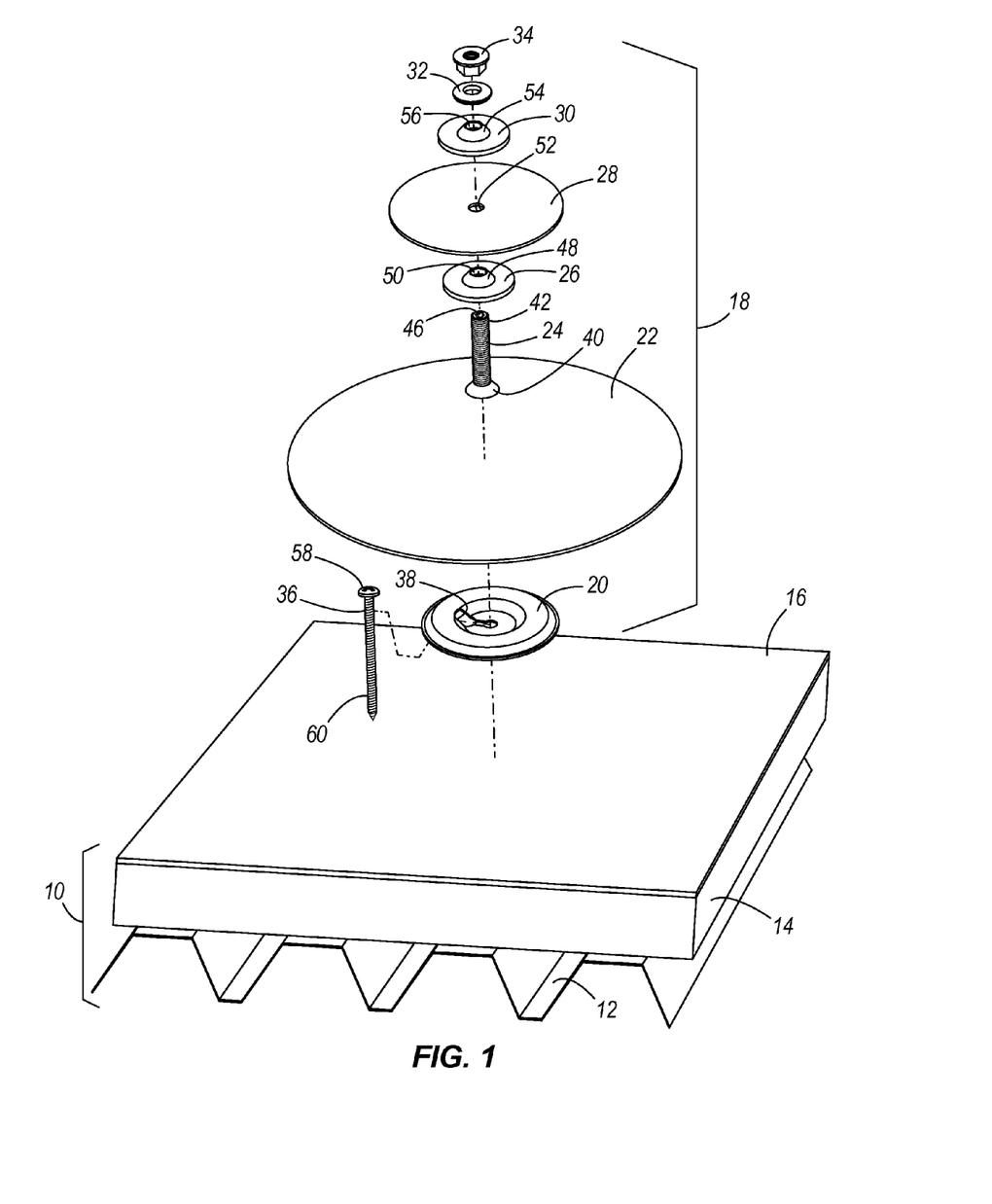
FIG. 1 is an exploded perspective view of a roof mount assembly over a roof according to some embodiments of the present invention.
Figure 2:
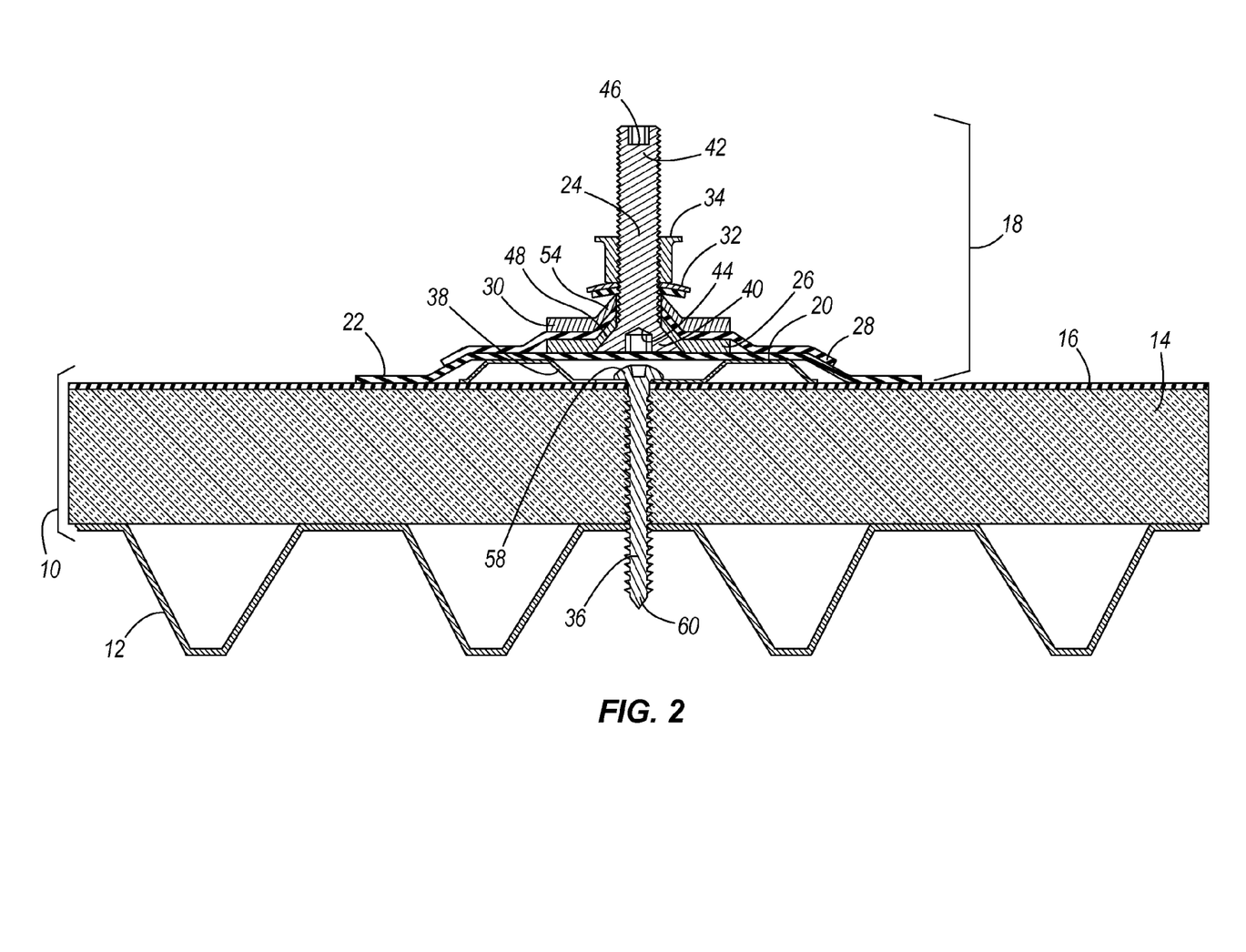
FIG. 2 is a cross-sectional view of the roof mount assembly taken along line 2-2 of FIG. 1.

FIGS. 1 and 2 illustrate a roofing system 10 including a metal roof deck 12, a roof substrate 14 (e.g., insulation, tar-paper, plywood or other decking material, and the like) supported on the roof deck 12, a membrane 16 extending across the substrate 14 (i.e., placed immediately adjacent an upper surface of the substrate 14 or supported on one or more intermediate layers of roofing or sealing material, which in turn are placed on the substrate 14). The roofing system 10 can be utilized on any of a variety of roof types, such as slate roofs, membrane roofs, aluminum roofs, standing seam roofs, tile roofs, shingle roofs, and the like.

The roofing system 10 is operable to support any of a variety of roof-mounted fixtures, such as, for example, snow fences, solar panels, conduit for solar panels, cables for lighting rods, an antenna, signs, billboards, or any of a number of other roof-mountable assemblies. Depending on one or more of the geographic location, anticipated quantity and type of precipitation, and anticipated roof and wind loading, the roofing system 10 can include any of a variety of membrane, flashing, seal and plate arrangements, as will be discussed below.

Figure 3:
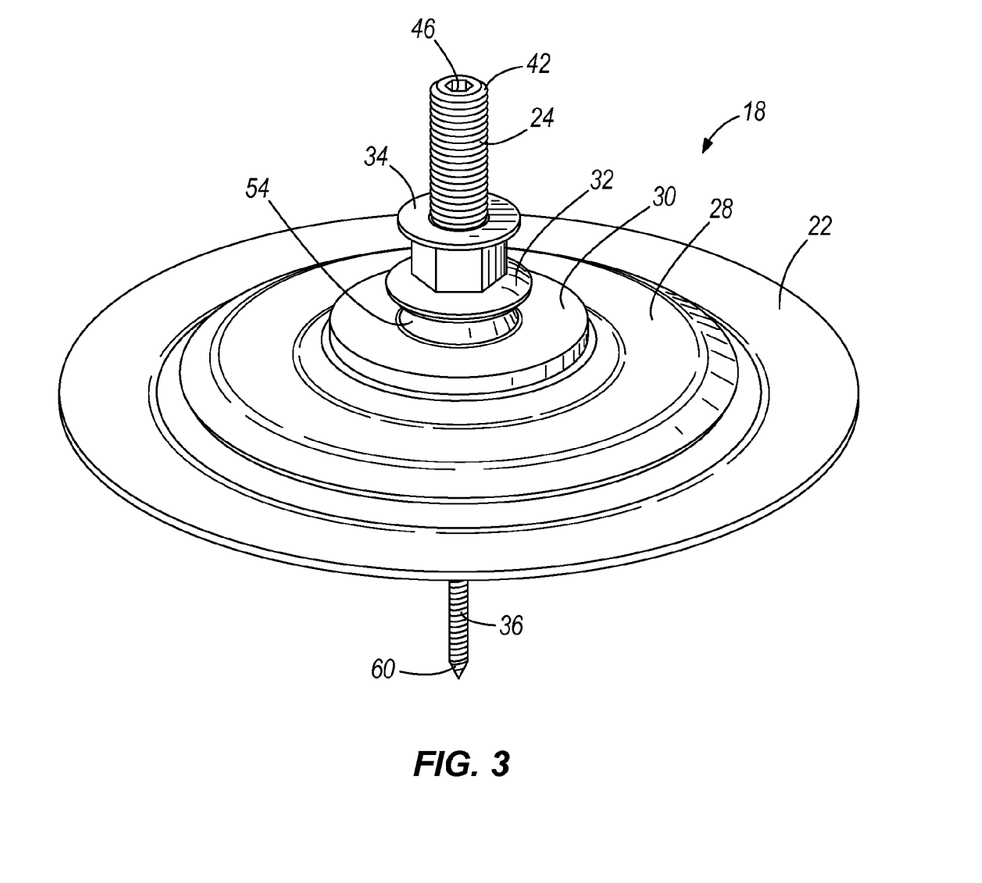
FIG. 3 is a perspective view of the roof mount assembly according to some embodiments of the present invention.

A roof attachment assembly 18 can be coupled to the roofing system 10 with few or no fasteners extending through the membrane 16. One such roof attachment assembly 18 is illustrated in FIGS. 1-3 and includes a plate 20, a first membrane patch 22, a first fastener 24, a first disc 26, a second membrane patch 28, a second disc 30, a washer 32 and a nut 34.

The roof attachment assembly 18 can be coupled to the roofing system 10 with any suitable non-penetrating fastening method, such as welding, adhering, gluing, bonding, and the like or by any suitable penetrating method, such as by one or more fasteners extending through the membrane 16. The illustrated roof attachment assembly 18 is coupled to the roofing system 10 by at least one of a second fastener 36 extending into the roofing system 10 and a weld formed between the first membrane patch 22 and the membrane 16. The first membrane patch 22 seals any penetrations caused by the second fastener 36.

As illustrated in FIGS. 1 and 2, the illustrated roof attachment assembly 18 includes a modified RhinoBond® plate as the plate 20. The illustrated plate 20 is metallic and includes a slot 38. In other embodiments, the plate 20 can include a polymeric or a ceramic material. Other plates, such as a plate provided by Centrix™ electrobonding system can be utilized. A variety of plates, discs and the like can be used in place of plate 20 and reference is made to the discussion of FIGS. 5-7 below for some examples of suitable plates.

The roof attachment assembly 18 is operable to support any of a variety of roof-mounted fixtures, such as snow guards, snow fences, solar panels, conduit for solar panels, cables for lighting rods, an antenna, signs, billboards, or any other assembly mountable to a roof. Some roof-mounted fixtures are described in detail in commonly-assigned U.S. Pat. No. 5,609,326, filed Jun. 16, 1995, and U.S. Pat. No. 6,526,701, filed Dec. 6, 2000, the contents of both of which are herein incorporated by reference.

The first membrane patch 22 is flexible and conformable to the contour of the plate 20. The first membrane patch 22 is coupleable to the membrane 16 to substantially seal any aperture caused by the second fastener 36. In some embodiments, the first membrane patch 22 is a target patch that can be welded to the membrane 16. One such welding technique is provided by Rhinobond®. Another such welding technique is provided by Centrix™ electrobonding. Other welding or coupling techniques can be utilized to affix the first membrane patch 22 to the membrane 16.

The illustrated first fastener 24 includes a head 40 and a shaft 42 and is a socket flat head cap screw with double hex ends. The head 40 includes a first hex socket 44 and the shaft 42 includes a second hex socket 46. The illustrated head 40 is tapered outward from the shaft 42. The nut 34 is tightened onto the first fastener 24 by a user inserting a tool, such as a hex key, into the first hex socket 44 and by grasping the nut 34 with a tool, such as a wrench. The first disc 26, the second membrane patch 28, the second disc 30 and the washer 32 are compressed between the head of the first fastener 24 and the nut 34. The first fastener 24 is operable to support one or more roof mounted fixtures. The roof mounted fixture(s) is coupled to the first fastener 24 and a user tightens a nut or other suitable fastener on the first fastener 24. In order to tighten the nut, the user can insert a tool, such as a hex key, into the second hex socket 46 to prevent the first fastener 24 from rotating.

The illustrated first disc 26 includes a substantially centrally located frustoconical protrusion 48 with an aperture 50. The illustrated first disc 26 is metallic, but in other embodiments, can include plastic, ceramic or a combination of plastic, ceramic and metal.

The illustrated second membrane patch 28 includes a substantially centrally located aperture 52. The second membrane patch 28 is flexible and conformable to the frustoconical protrusion 48. The illustrated frustoconical protrusion 48 substantially corresponds to the outwardly tapered head 40 of the first fastener 24. The second membrane patch 28 is coupleable to the first membrane patch 22 to form a substantially water-tight seal.

The illustrated second disc 30 is substantially identical to the illustrated first disc 26. The illustrated second disc 30 includes a substantially centrally located frustoconical protrusion 54 with an aperture 56. The illustrated frustoconical protrusion 54 substantially corresponds to the frustoconical protrusion 48 and the outwardly tapered head 40 of the first fastener 24. The illustrated second disc 30 is metallic, but in other embodiments, can include plastic, ceramic or a combination of plastic, ceramic and metal. In some embodiments, at least one of the first disc 26 and the second disc 30 can be omitted.

The illustrated washer 32 is a bonded washer that includes a metallic portion and a polymeric portion. Other washers or similar configurations can be utilized in place of the illustrated washer 32.

The illustrated nut 34 is a flange nut having a hexagonal portion and a circular portion. Other nuts or fastening devices can be utilized in place of the illustrated nut 34.

When the roof attachment assembly 18 is assembled, the first fastener 24 extends through the aperture 50 of the first disc 26, the aperture 52 of the second membrane patch 28, the aperture 56 of the second disc 30, the washer 32 and the nut 34. The second membrane patch 28 is compressed between the first disc 26 and the second disc 30 and is deformed by the frustoconical protrusions 50 and 56. The second membrane patch 28 is connected to the first membrane patch 22, and the plate 20 is connected to the first membrane patch 22, for example by welding. The plate 20, the first membrane patch 22, the first fastener 24, the first disc 26, the second membrane patch 28, the second disc 30, the washer 32 and the nut 34 are coupled to form the roof attachment assembly 18 as a single unit, as illustrated in FIGS. 1-3.

The first fastener 24 and the first disc 26 are not welded or fixed to either the first membrane patch 22 or the second membrane patch 28. Rather, the first fastener 24 and the first disc 26 are free to move with respect to the first membrane patch 22 and with respect to the second membrane patch 28. Further, the second disc 30 is not welded or fixed to the second membrane patch 28. Rather, the second disc 30 is free to move with respect to the second membrane patch 28.

The second fastener 36 includes a head 58 and a shaft 60. The head 58 has a diameter that is substantially larger than a diameter of the shaft 60.

The roof attachment assembly 18 is coupled to the roofing system 10 by the second fastener 36 extending through the slot 38 and into the roofing system 10 and by connecting (for example, welding) the first membrane patch 22 to the plate 20 and to the membrane 16. When the roof attachment assembly 18 is coupled to the roofing system 10, the first mode of failure is pulling the first disc 26 through the second membrane patch 28. The first mode of failure is accomplished by either stretching the second membrane patch 28 to permit the first disc 26 to escape through the aperture 52 of the second membrane patch 28 or by tearing of the second membrane patch 28. In one trial, and given by way of example only, the first failure mode occurs around about 250 pounds of force pulling the roof attachment assembly 18 off of the roofing system 10. In contrast, the weld formed between the membrane 16 and the first membrane patch 22 and/or the weld formed between the first membrane patch 22 and the second membrane patch 26 fails around about 500 lbs force pulling the roof attachment assembly 18 off of the roofing system 10. The configuration of the present application designs the roof attachment assembly 18 to fail in such a way as to avoid damage to the roofing system 10.

In some embodiments, the second membrane patch 28 stretches from between one to two inches without tearing, and without permanently deforming. Specifically, after stretching from between about one to two inches, the second membrane patch 28 reassumes the previous shape. Such stretching provides resilience in windy climates and in locations with seismic activity. In some embodiments, the second membrane patch 28 can stretch about one-half inch laterally and about one inch axially (along an axis of the first fastener 24) without breaking or permanently deforming.

Figure 4:
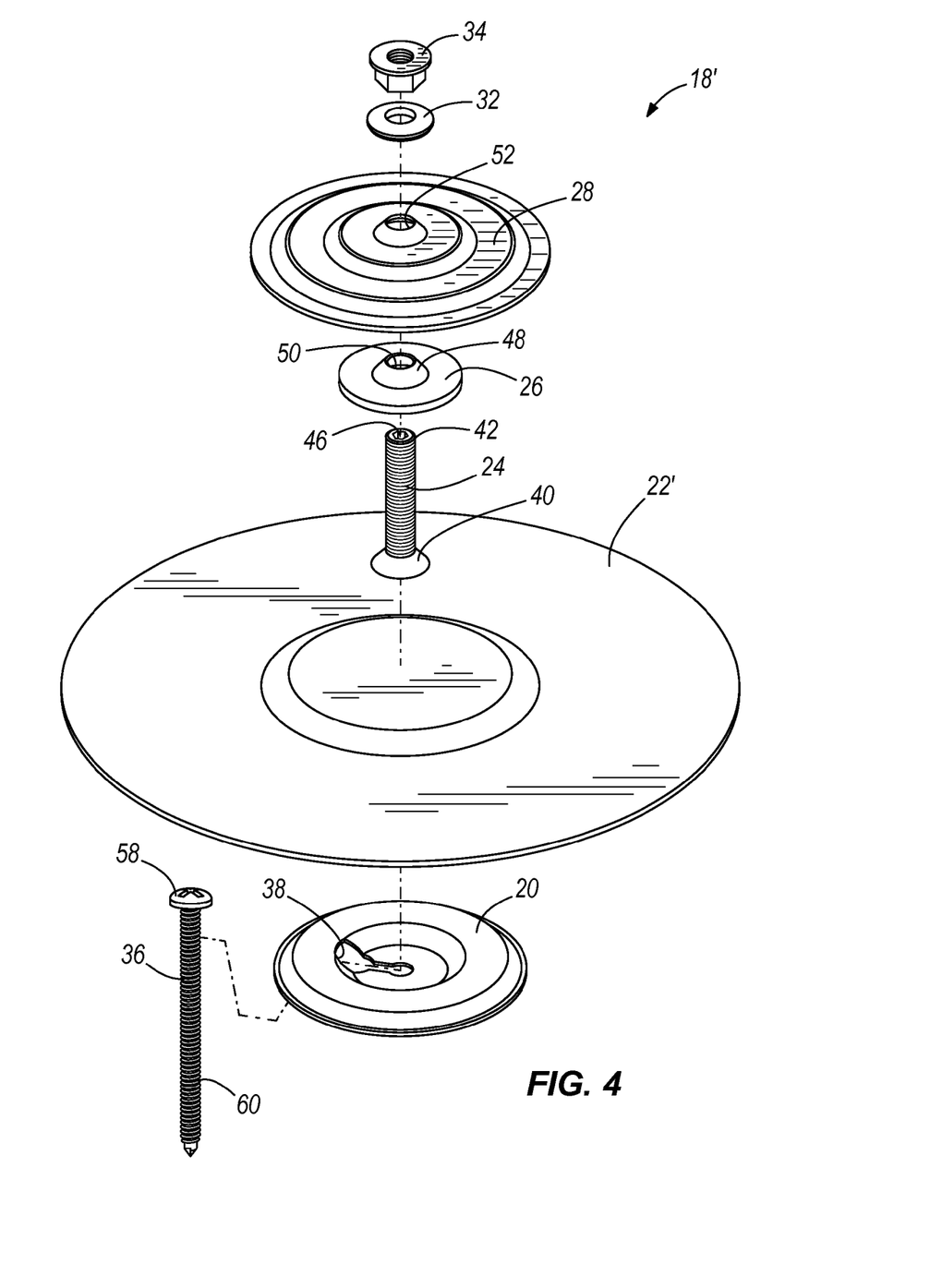
FIG. 4 is an exploded perspective view of a roof mount assembly according to some embodiments of the present invention.

An alternative embodiment of a roof attachment assembly 18' is illustrated in FIG. 4. The roof attachment assembly 18' is similar to the roof attachment assembly 18 and only the differences will be discussed in detail herein. The components which are identical are given the same numeral used in FIGS. 1-3 and the components which differ are given a prime (') after the numeral used in FIGS. 1-3. The primary difference is that the roof attachment assembly 18' omits the second disc 30. Another difference is that the first membrane patch 22' has a greater diameter than the first membrane patch 22. The first membrane patch 22' and the second membrane patch 28 of FIG. 4 are shown with the deformations or contours that are formed when the roof attachment assembly 18' is assembled.

Figure 5:
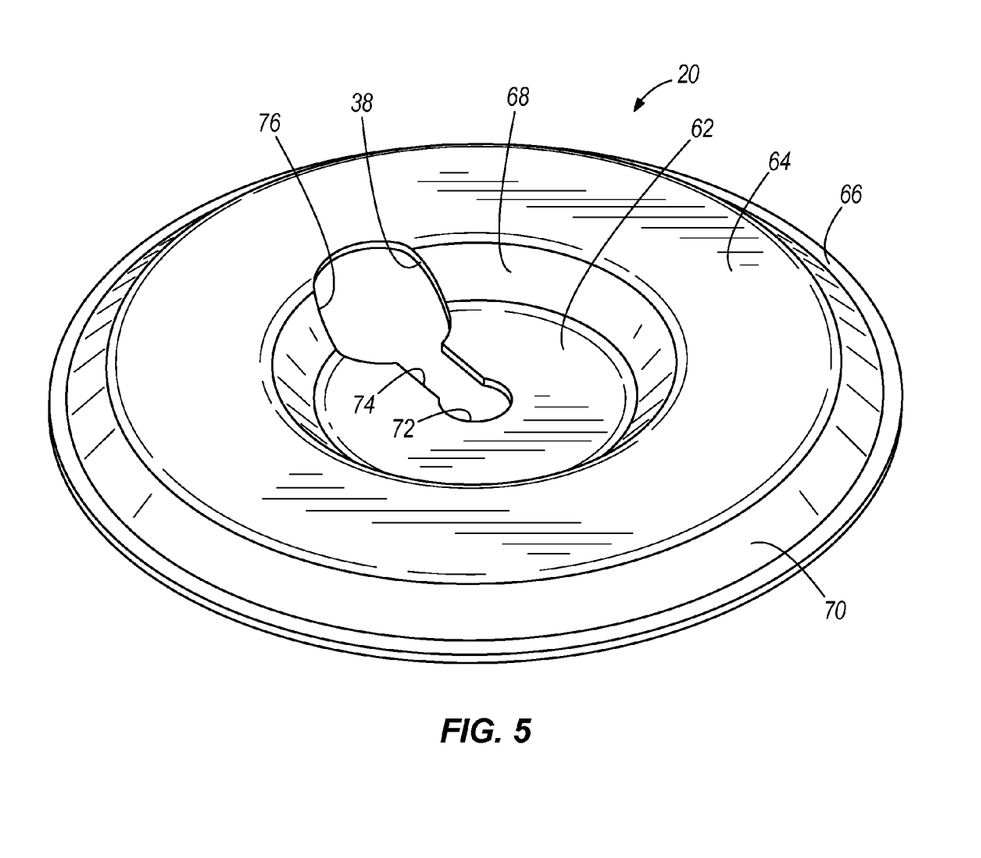
FIG. 5 is a perspective view of a plate from the roof mount assembly according to some embodiments of the present invention.

FIG. 5 more clearly illustrates the plate 20 with the slot 38 of the embodiments shown in FIGS. 1-4. The plate 20 includes a central recessed portion 62, a middle raised portion 64 and an outer recessed portion 66. The middle raised portion 64 is substantially ring-shaped and substantially encircles the central recessed portion 62. The middle raised portion 64 is positioned in a plane that is spaced from a plane defined by the central recessed portion 62. A first tapered portion 68 extends between the central recessed portion 62 and the middle raised portion 64. The outer recessed portion 66 is substantially ring-shaped and substantially encircles the central recessed portion 62 and the middle raised portion 64. The outer recessed portion 66 is positioned in a plane that is spaced from the plane defined by the middle raised portion 64. In the illustrated embodiment, the central recessed portion 62 and the outer recessed portion 66 are substantially coplanar. A second tapered portion 70 extends between the middle raised portion 64 and the outer recessed portion 66.

The slot 38 includes a first slot portion 72, a second slot portion 74 and a third slot portion 76. The illustrated first slot portion 72 is positioned in the central recessed portion 62, is substantially centrally located and is substantially circular. The illustrated second slot portion 74 is substantially linear, extends radially along the central recessed portion 62 and is connected to the first slot portion 72. The illustrated third slot portion 76 is connected to the second slot portion 74 and extends from the central recessed portion 62, across the first tapered portion 68 and onto the middle raised portion 64. The first slot portion 72 defines a first width (which is a diameter in the illustrated embodiment), the second slot portion 74 defines a second width and the third slot portion 76 defines a third width. The first width is greater than the second width and the third width is greater than the first width and is greater than the second width. The first width is wider than the shaft 60 of the second fastener 36, but is narrower than the head 58 of the second fastener 36. The second width is substantially identical to the shaft 60 of the second fastener 36 and is narrower than the head 58 of the second fastener 36. The third width is wider than both the shaft 60 and the head 58 of the second fastener 36. The second fastener 36 is insertable through the third slot portion 76, along the second slot portion 74 and into the first slot portion 72. The slot 38 is sized to receive the second fastener 36 after the second fastener 36 has been installed in the roofing system 10.

Installation of the roof attachment assembly 18, 18' on the roofing system 10 according to some embodiments is accomplished by the following steps: installing the second fastener 36 into the roofing system 10, positioning the assembled roof attachment assembly 18, 18' proximate the second fastener 36, lifting a portion of the first membrane patch 22 to expose the slot 38, inserting the head 58 of the second fastener 36 through the third slot portion 76, sliding the shaft 60 of the second fastener 36 along the second slot portion 74 until the shaft 60 abuts the first slot portion 72, and welding the first membrane patch 22 to the membrane 16. In some embodiments, the roof attachment assembly 18, 18' is oriented such that the slot 38 is positioned on a downhill part of the roof (such as when the roofing system 10 is sloped).

Figure 6:
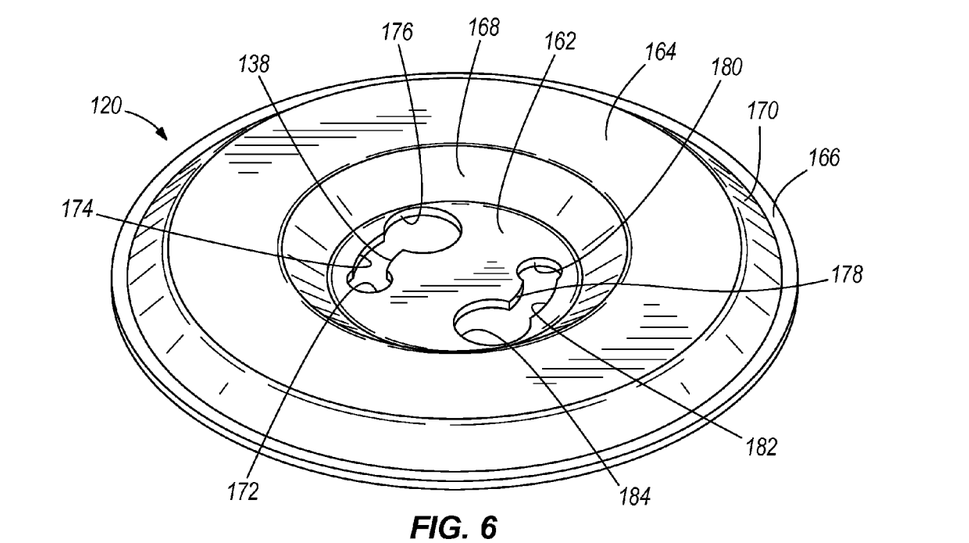
FIG. 6 is a top view of a plate for a roof mount assembly according to some embodiments of the present invention.

Other configurations of plates can be utilized in place of the plate 20. FIG. 6 illustrates a plate 120 that has a similar overall shape of plate 20. Specifically, the plate 120 includes a central recessed portion 162, a middle raised portion 164 and an outer recessed portion 166. The middle raised portion 164 is substantially ring-shaped and substantially encircles the central recessed portion 162. The middle raised portion 164 is positioned in a plane that is spaced from a plane defined by the central recessed portion 162. A first tapered portion 168 extends between the central recessed portion 162 and the middle raised portion 164. The outer recessed portion 166 is substantially ring-shaped and substantially encircles the central recessed portion 162 and the middle raised portion 164. The outer recessed portion 166 is positioned in a plane that is spaced from the plane defined by the middle raised portion 164. In the illustrated embodiment, the central recessed portion 162 and the outer recessed portion 166 are substantially co-planar. A second tapered portion 170 extends between the middle raised portion 164 and the outer recessed portion 166.

The illustrated plate 120 includes a first slot 138 having a first slot portion 172, a second slot portion 174 and a third slot portion 176 and a second slot 178 having a first slot portion 180, a second slot portion 182 and a third slot portion 184. The first slot 138 and the second slot 178 are defined in the central recessed portion 162. The plate 120 is connected to the remaining components of the roof attachment assembly 18, 18' to form a single assembled unit.

The first slot 138 is substantially identical to the second slot 178 and is circumferentially offset from the second slot 178. Only the first slot 138 will be discussed in detail herein, but the discussion equally applies to the second slot 178. The illustrated first slot portion 172 is positioned in the central recessed portion 162 and is substantially circular. The illustrated second slot portion 174 is substantially arcuate, extends along the central recessed portion 162 and is connected to the first slot portion 172. The illustrated third slot portion 176 is connected to the second slot portion 174 and is positioned on the central recessed portion 162. The first slot portion 172 defines a first width (which is a diameter in the illustrated embodiment), the second slot portion 174 defines a second width and the third slot portion 176 defines a third width. The first width is greater than the second width and the third width is greater than the first width and is greater than the second width. The first width is wider than the shaft 60 of the second fastener 36, but is narrower than the head 58 of the second fastener 36. The second width is substantially identical to the shaft 60 of the second fastener 36 and is narrower than the head 58 of the second fastener 36. The third width is wider than both the shaft 60 and the head 58 of the second fastener 36. The second fastener 36 is insertable through the third slot portion 176, along the second slot portion 174 and into the first slot portion 172. The first slot 138 is sized to receive the second fastener 36 after the second fastener 36 has been installed in the roofing system 10.

Installation of the roof attachment assembly 18, 18' with the plate 120 on the roofing system 10 according to some embodiments is accomplished by the following steps: installing two of the second fasteners 36 into the roofing system 10 spaced apart from one another, positioning the roof attachment assembly 18, 18' with the plate 120 above the second fasteners 36, lowering the roof attachment assembly 18, 18' onto the roofing system 10 such that the second fasteners 36 are received in the respective first and second slots 138, 178, rotating the roof attachment assembly 18, 18' with the plate 120 such that the second fasteners 36 move from the first slot portions 176, 184, along the second slot portions 174, 182 and into the first slot portions 172, 180, respectively, and welding the first membrane patch 22 onto the membrane 16.

Figure 7:
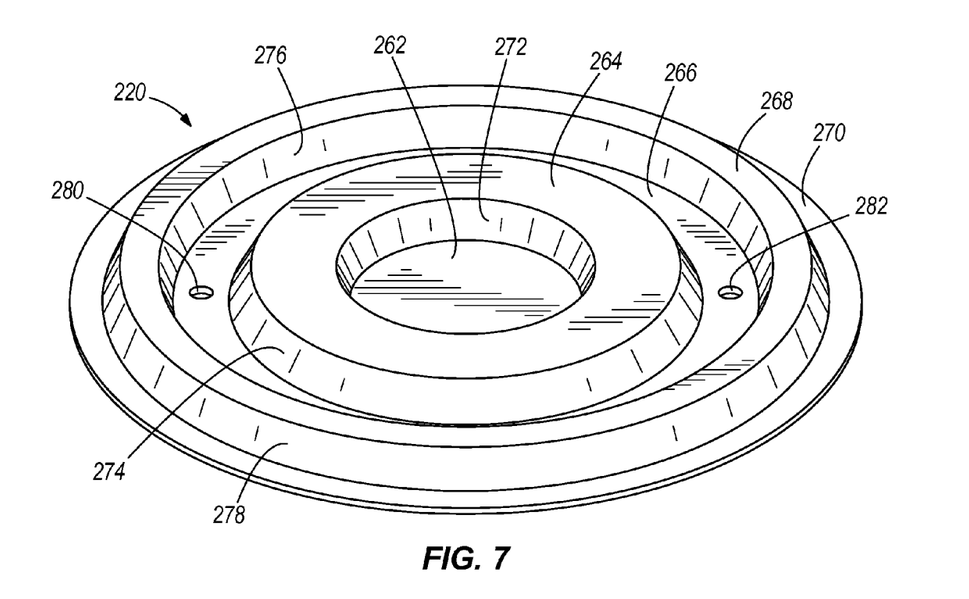
FIG. 7 is a perspective cross-sectional view of a plate for a roof mount assembly according to some embodiments of the present invention

Another plate 220 that is useable with the roof attachment assembly 18, 18' is illustrated in FIG. 7. The plate 220 includes a first recessed portion 262, a first raised portion 264, a second recessed portion 266, a second raised portion 268 and a third recessed portion 270.

The first recessed portion 262 is substantially centrally located in the plate 220 and is substantially circular.

The first raised portion 264 is substantially ring-shaped and substantially encircles the first recessed portion 262. The first raised portion 264 is positioned in a plane that is spaced from a plane defined by the first recessed portion 262. A first tapered portion 272 extends between the first recessed portion 262 and the first raised portion 264.

The second recessed portion 266 is substantially ring-shaped and substantially encircles the first recessed portion 262 and the first raised portion 264. The second recessed portion 266 is positioned in a plane that is spaced from the plane defined by the first raised portion 264. In the illustrated embodiment, the first recessed portion 262 and the second recessed portion 266 are substantially co-planar. A second tapered portion 274 extends between the first raised portion 264 and the second recessed portion 266.

The second raised portion 268 is substantially ring-shaped and substantially encircles the first recessed portion 262, the first raised portion 264 and the second recessed portion 266. The second raised portion 268 is positioned in a plane that is spaced form the plane defined by the first and second recessed portions 262 and 266. In the illustrated embodiment, the first raised portion 264 and the second raised portion 268 are substantially co-planar. A third tapered portion 276 extends between the second recessed portion 266 and the second raised portion 268.

The third recessed portion 270 is substantially ring-shaped and substantially encircles the first recessed portion 262, the first raised portion 264, the second recessed portion 266 and the second raised portion 268. The third recessed portion 270 is positioned in a plane that is spaced from the plane defined by the first and second raised portions 264 and 268. In the illustrated embodiment, the first recessed portion 262, the second recessed portion 266 and the third recessed portion 270 are substantially co-planar. A fourth tapered portion 278 extends between the second raised portion 268 and the third recessed portion 270.

The illustrated plate 220 defines a first aperture 280 and a second aperture 282 defined in the second recessed portion 266. Other apertures can be formed in the second recessed portion (to have three, four or more total apertures). Also, one or more apertures can be provided in other portions of the plate 220. The plate 220 is connected to the remaining components of the roof attachment assembly 18, 18' to form a single assembled unit.

Installation of the roof attachment assembly 18, 18' with the plate 220 on the roofing system 10 according to some embodiments is accomplished by the following steps: positioning the roof attachment assembly 18, 18' with the plate 220 on the roofing system 10, lifting a first portion of the first membrane patch 22 to expose the first aperture 280, inserting one second fastener 36 into the first aperture 280 and installing the second fastener 36 in the roofing system 10, lifting a second portion of the first membrane patch 22 to expose the second aperture 282, inserting another second fastener 36 into the second aperture 282 and installing the second fastener 36 in the roofing system 10, and welding the first membrane patch 22 onto the membrane 16.

Other shapes and quantities of recessed portions and raised portions can be utilized and the plates 20, 120, 220 illustrated in FIGS. 5-7 are given by way of example only.

Although the illustrated roof attachment assembly 18, 18' is substantially circular, other shapes are possible. For example, the roof attachment assembly 18 can be square, ovular, round, rectangular, triangular, pentagonal or other regular or non-regular shape.

Figure 8:
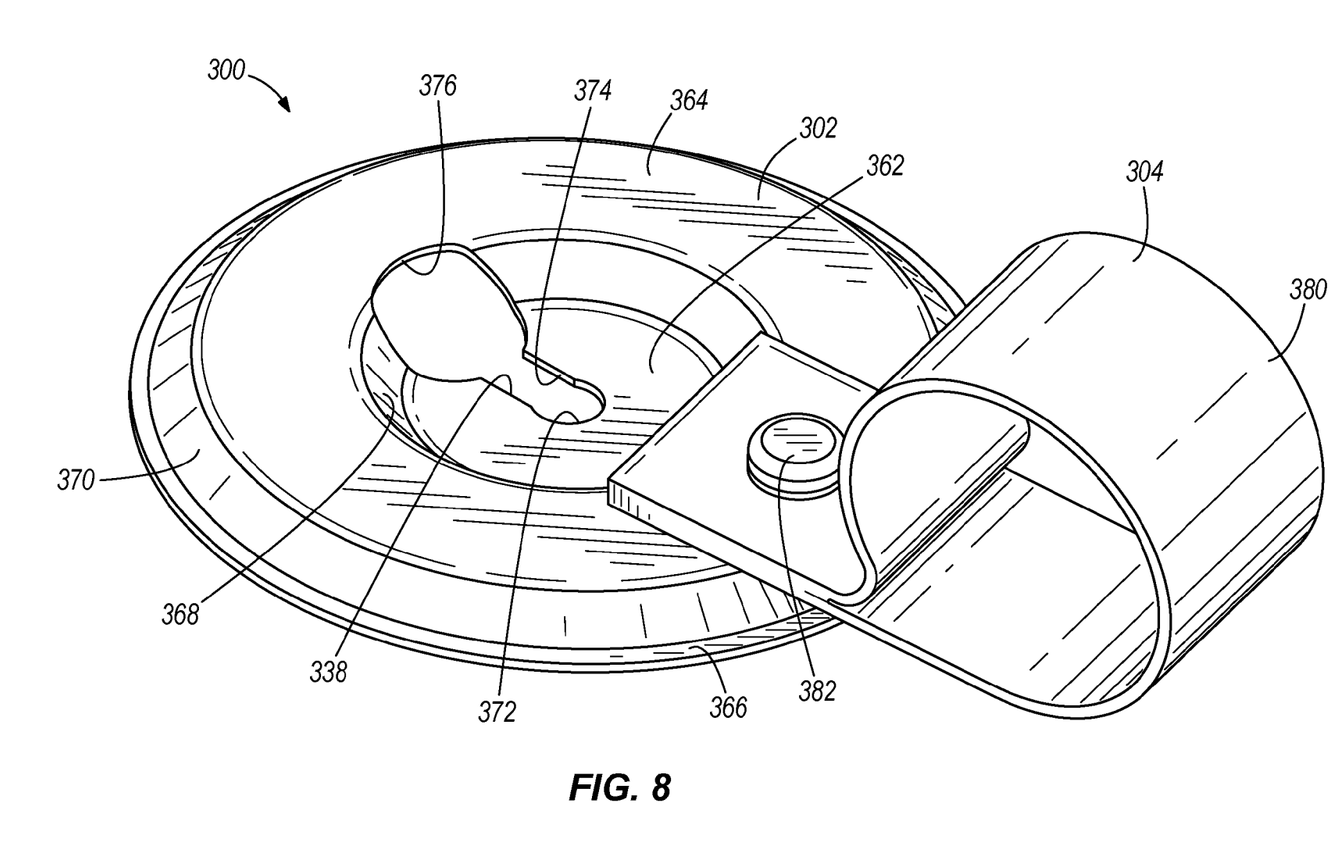
FIG. 8 is a perspective view of a screw depth measuring tool according to some embodiments of the present invention.

In some embodiments, a gauge can be utilized to assure that the second fastener(s) 36 are drilled to the proper depth, thereby leaving a sufficient amount of the shaft 60 above the roofing system 10 to permit the plate 20, 120 to be installed on the second fastener(s) 36. One such gauge 300 is illustrated in FIG. 8. The illustrated gauge 300 includes a plate portion 302 which is similar to the plate 20, and a handle 304. The plate portion 302 defines a slot 338 and includes a central recessed portion 362, a middle raised portion 364 and an outer recessed portion 366. The middle raised portion 364 is substantially ring-shaped and substantially encircles the central recessed portion 362. The middle raised portion 364 is positioned in a plane that is spaced from a plane defined by the central recessed portion 362. A first tapered portion 368 extends between the central recessed portion 362 and the middle raised portion 364. The outer recessed portion 366 is substantially ring-shaped and substantially encircles the central recessed portion 362 and the middle raised portion 364. The outer recessed portion 366 is positioned in a plane that is spaced from the plane defined by the middle raised portion 364. In the illustrated embodiment, the central recessed portion 362 and the outer recessed portion 366 are substantially co-planar. A second tapered portion 370 extends between the middle raised portion 364 and the outer recessed portion 366.

The slot 338 includes a first slot portion 372, a second slot portion 374 and a third slot portion 376. The illustrated first slot portion 372 is positioned in the central recessed portion 362, is substantially centrally located and is substantially circular. The illustrated second slot portion 374 is substantially linear, extends radially along the central recessed portion 362 and is connected to the first slot portion 372. The illustrated third slot portion 376 is connected to the second slot portion 374 and extends from the central recessed portion 362, across the first tapered portion 368 and onto the middle raised portion 364. The first slot portion 372 defines a first width (which is a diameter in the illustrated embodiment), the second slot portion 374 defines a second width and the third slot portion 376 defines a third width. The first width is greater than the second width and the third width is greater than the first width and is greater than the second width. The first width is wider than the shaft 360 of the second fastener 336, but is narrower than the head 358 of the second fastener 336. The second width is substantially identical to the shaft 360 of the second fastener 336 and is narrower than the head 358 of the second fastener 336. The third width is wider than both the shaft 360 and the head 358 of the second fastener 336.

The illustrated handle 304 includes a loop of material 380 and is coupled to the plate portion 302 with a fastener 382. Other shapes, sizes and configurations can be utilized in place of the illustrated handle 304, as long as it is graspable by a user to move the gauge 300.

A user can grasp the handle 304 while installing one of the second fasteners 36 through the first slot portion 372, such that the second fastener 36 is positioned at an appropriate depth in the roofing system 10. Then, the user can move the plate 320 with respect to the roofing system 10 to slide the second fastener 36 along the second slot portion 374 and through the third slot portion 376 to remove the plate 320 from the second fastener 36. The gauge 300 can be used multiple times to properly calibrate the distance the head 58 between the second fastener 36 and the roofing system 10 required to permit installation of the plate 20, 120 on the second fastener 36.

Figure 9:
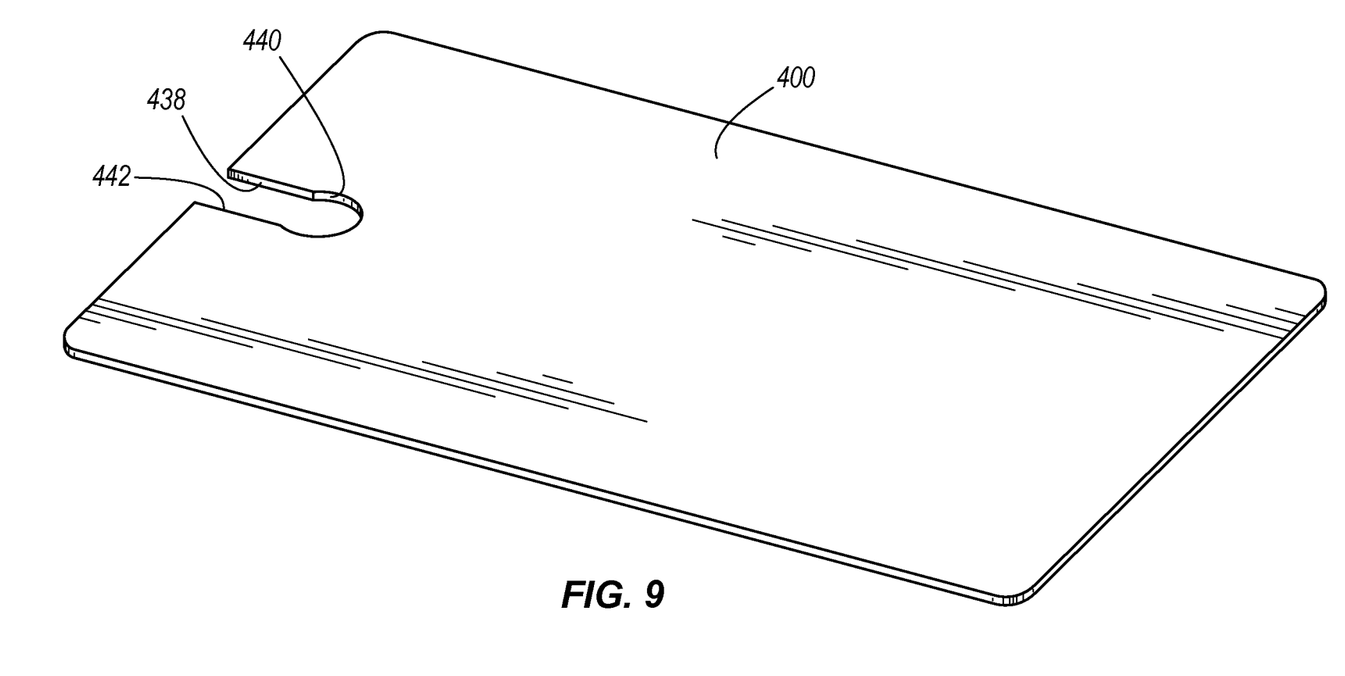
FIG. 9 is a perspective view of a screw depth measuring tool according to some embodiments of the present invention.

Another embodiment of a gauge 400 is illustrated in FIG. 9. The illustrated gauge 400 is a planar and is substantially rectangular in shape. The illustrated gauge 400 defines a slot 438 having a first slot portion 440 and a second slot portion 442. The illustrated first slot 438 is sized to receive the shaft 60 of the second fastener 36 therethrough, but is smaller than the head 58 of the second fastener 36. In some embodiments, the gauge 400 is approximate the size of a credit card, to permit a user to store the gauge 400 in a pocket or wallet.

A user can grasp the gauge 400 while installing one of the second fasteners 36 through the first slot portion 440, such that the second fastener 36 is positioned at an appropriate depth in the roofing system 10. Then, the user can move the gauge 400 with respect to the roofing system 10 to slide the second fastener 36 along the second slot portion 442 and out of the slot 438 to remove the gauge 400 from the second fastener 36. The gauge 400 can be used multiple times to properly calibrate the distance the head 58 between the second fastener 36 and the roofing system 10 required to permit installation of the plate 20, 120 on the second fastener 36.

Various features and advantages of the invention are set forth in the following claims.

What is claimed is:

1. A roof mounting system for mounting one or more roof-mounted fixtures to a roof, the roofing mounting system comprising:
    a roofing system including a top surface;
    a roof attachment assembly mountable to the top surface of the roofing system, the roof attachment assembly including
        a plate having a plate aperture,
        at least one membrane patch coupled to the plate, at least one disc including a disc aperture;
        a nut, and
        a first fastener including a first head positioned adjacent the at least one membrane patch and a first shaft extending through the disc aperture and the nut; and
    a second fastener including a second head positioned adjacent the plate and a second shaft extending through the plate aperture and through the roofing system top surface, to couple the roof attachment assembly to the roofing system, wherein the plate includes a central recessed portion, a raised portion and a transition portion extending between the central recessed portion and the raised portion.

2. The roof mounting system of claim 1, wherein the plate aperture is defined in at least one of the central recessed portion, the raised portion and the transition portion.

3. The roof mounting system of claim 2, wherein the plate aperture is defined in the central recessed portion, the transition portion and the raised portion, such that a first portion of the plate aperture is positioned adjacent the top surface and a second portion of the plate aperture is spaced from the top surface.

4. The roof mounting system of claim 3, wherein the second head is insertable into the plate aperture after the second fastener is coupled to the roofing system.

5. The roof mounting system of claim 1, wherein the plate aperture includes a first portion, a second portion and a third portion, wherein the first portion has a first width extending substantially perpendicular to an axis of the first fastener, wherein the third portion has a second width extending substantially perpendicular to the axis of the first fastener, wherein the second width is greater than the first width, and wherein the second portion connects the first portion and the third portion.

6. The roof mounting system of claim 5, wherein the first portion is substantially circular, wherein the second portion is substantially linear, and wherein the third portion is substantially circular.

7. The roof mounting system of claim 5, wherein the second head is insertable into the third portion and slidable along the second portion toward the first portion, after the second fastener is coupled to the roofing system.

8. The roof mounting system of claim 1, further comprising a membrane defining the top surface of the roofing system, wherein the at least one membrane patch has a first diameter and the plate has a second diameter, less than the first diameter, such that the at least one membrane patch is weldable to the membrane to further couple the roof attachment assembly to the roofing system.

9. The roof mounting system of claim 8, wherein the at least one membrane patch includes a first membrane patch and a second membrane patch, and wherein the at least one disc includes a first disc and a second disc, wherein the first membrane patch is positioned between the plate and the first disc, and the second membrane patch includes an aperture and is positioned between the first disc and the second disc, and wherein the first fastener extends through the first disc, the aperture of the second membrane patch, the second disc and the nut.

10. The roof mounting system of claim 9, wherein the first membrane patch is weldable to the membrane to couple the first membrane patch to the top surface of the roofing system and the second membrane patch is weldable to the first membrane patch to couple the second membrane patch, the first fastener, the first disc, the second disc and the nut to the first membrane and the plate.

11. The roof mounting system of claim 9, wherein the second membrane patch is at least one of deformable and frangible to permit the first disc to slide through the aperture in the second membrane patch upon application of a first force, wherein the first membrane patch is separable from the membrane upon application of a second force, and wherein the second force is greater than the first force.

12. The roof mounting system of claim 11, wherein the first force includes at least one of a first tensile force and a first shear force, wherein the second force includes at least one of a second tensile force and a second shear force, and wherein the second tensile force is greater than the first tensile force and the second shear force is greater than the first shear force.

13. A roof attachment assembly mountable to a top surface of a roofing system, the roof attachment assembly comprising:
a plate defining an aperture and having a central recessed portion, a middle raised portion, a first transition between the central recessed portion and the middle raised portion, an outer recessed portion, and a second transition between the middle raised portion and the other recessed portion;
a first membrane patch coupled to the middle raised portion of the plate;
a disc including a disc aperture;
a second membrane patch coupled to the first membrane patch and substantially containing the disc between the first membrane patch and the second membrane patch, the second membrane including a membrane aperture; and
a first fastener including a head positioned adjacent the first membrane patch and a shaft extending through the disc aperture and the membrane aperture,
wherein the plate is coupleable to a roof system by installing a second fastener in the roof and extending the second fastener through the plate aperture, and wherein the first fastener is coupleable to a roof-mounted apparatus to support the roof-mounted apparatus on the roofing system.

14. The roof attachment assembly of claim 13, wherein the plate aperture includes a first portion, a second portion and a third portion, wherein the first portion has a first width extending in a direction substantially perpendicular to an axis of the first fastener, wherein the third portion has a second width extending in a direction substantially perpendicular to the axis of the first fastener, wherein the second width is greater than the first width, and wherein the second portion connects the first portion and the third portion.

15. The roof attachment assembly of claim 13, further comprising a second disc and a nut, wherein the second membrane patch is positioned between the disc and the second disc, and wherein the first fastener extends through the second disc and the nut.

16. The roof attachment assembly of claim 13, wherein the first transition is tapered and the second transition is tapered, and wherein the central recessed portion and the outer recessed portion lie in substantially the same plane.

17. The roof attachment assembly of claim 13, wherein the roof attachment assembly is mountable to the top surface of the roofing system by at least one of welding the first membrane patch to the top surface, and coupling the second fastener to the roofing system and inserting the second fastener into the plate aperture.

18. The roof attachment assembly of claim 16, wherein the second membrane patch is at least one of deformable and frangible to permit the disc to slide through the aperture in the second membrane patch upon application of a first force, wherein the roof attachment assembly is separable from the roofing system upon application of a second force, and wherein the second force is greater than the first force.

19. The roof attachment assembly of claim 18, wherein the first force includes at least one of a first tensile force and a first shear force, wherein the second force includes at least one of a second tensile force and a second shear force, and wherein the second tensile force is greater than the first tensile force and the second shear force is greater than the first shear force.

20. A method of installing a roof attachment assembly to a top surface of a roofing system to permit mounting of a roof-mounted apparatus to the roofing system, the method comprising:
inserting a first fastener into the top surface of the roofing system, such that a head of the first fastener protrudes above the top surface of the roofing system;
positioning a roof attachment assembly adjacent the head of the first fastener;
inserting the head of the first fastener into an aperture defined in a plate of the roof attachment assembly;
moving the roof attachment assembly at least one of laterally and rotationally with respect to the head of the first fastener to couple the roof attachment assembly to the roofing system;
forming a seal around the first fastener; and
coupling a roof-mounted apparatus to the roof attachment assembly to thereby mount the roof-mounted apparatus to the roofing system.

21. The method of claim 20, wherein forming a seal includes adhering a membrane of the roof attachment assembly to the top surface of the roofing system.

22. The method of claim 21, wherein the top surface of the roofing system includes a membrane and wherein adhering the membrane of the roof attachment assembly to the top surface of the roofing system includes welding the membrane of the roof attachment assembly to the membrane of the roofing system around a perimeter of the plate.

23. The method of claim 22, wherein upon application of at least one of a tensile force and a shear force, the roof-mounted apparatus separates from the roof attachment assembly prior to the welded membrane separating from the membrane of the roofing system.

24. The method of claim 20, wherein inserting a first fastener into the top surface of the roofing system, such that a head of the first fastener protrudes above the top surface of the roofing system further includes positioning a gauge adjacent the top surface of the roofing system, inserting the first fastener into a slot in the gauge, and inserting the first fastener into the top surface of the roofing system, such that the head abuts the gauge, to thereby space the head a pre-determined distance from the top surface of the roofing system.

* * * * *